UNITED STATES PATENT OFFICE.

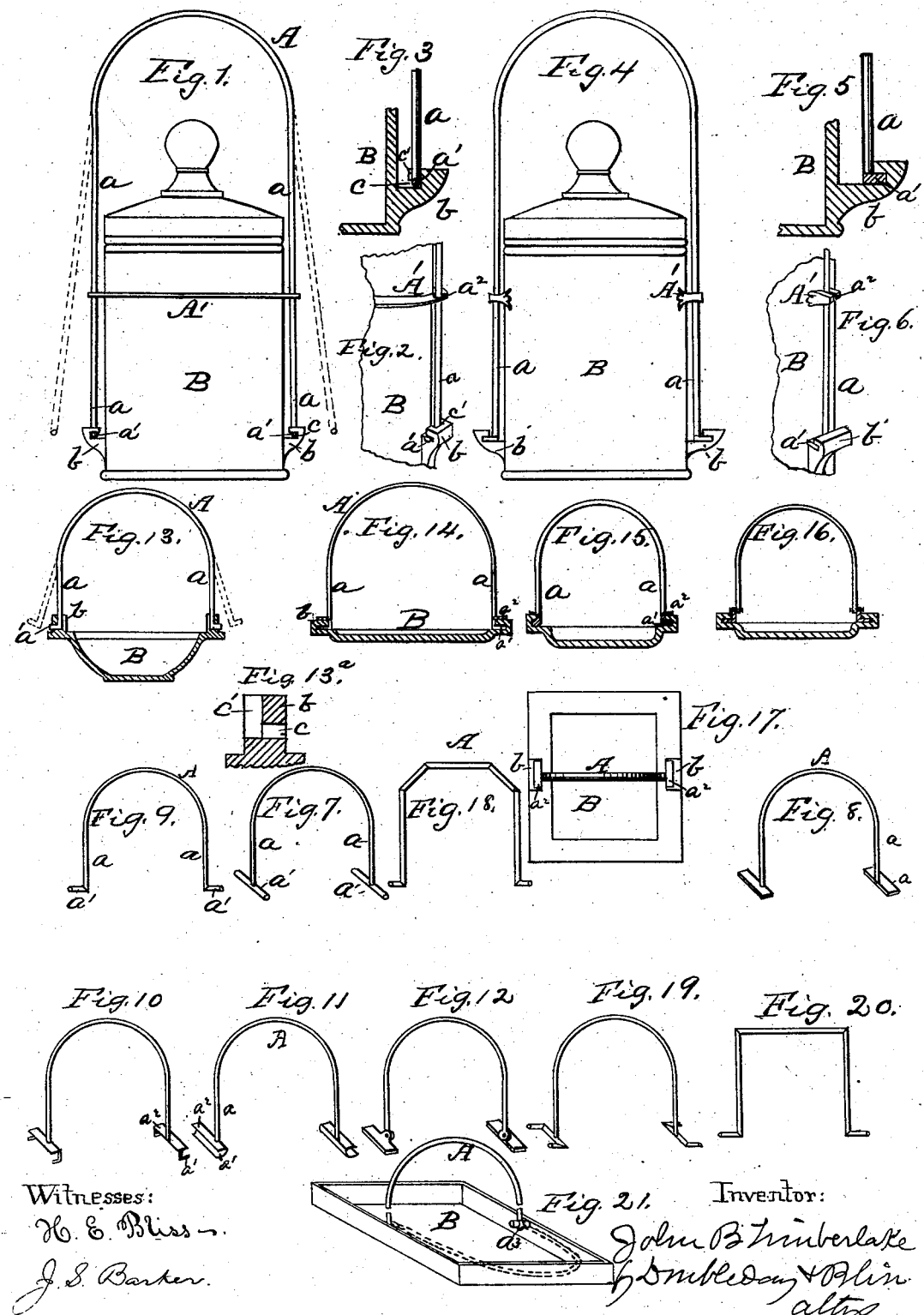

JOHN B. TIMBERLAKE, OF JACKSON, MICHIGAN.

DETACHABLE HANDLE FOR GLASS AND EARTHENWARE DISHES.

SPECIFICATION forming part of Letters Patent No. 294,289, dated February 26, 1884.

Application filed December 14, 1883. (No model.)

*To all whom it may concern:*

Be it known that I, JOHN B. TIMBERLAKE, a citizen of the United States, residing at Jackson, in the county of Jackson and State of Michigan, have invented certain new and useful Improvements in Detachable Handles for Glass and Earthenware Dishes, of which the following is a specification, reference being had therein to the accompanying drawings.

Figure 1 is a side view of a pickle-jar having my improved handle attached thereto. Fig. 2 is a perspective of a portion thereof. Fig. 3 is a section of a portion on an enlarged scale. Fig. 4 shows a modified form of jar-handle. Figs. 5 and 6 are details of that shown in Fig. 4. Fig. 7 shows detached a handle of the character in Figs. 1, 2, and 3. Fig. 8 shows detached the handle in Figs. 4, 5, and 6. Figs. 9, 10, 11, and 12 show modified forms of the handle detached. Figs. 13, 14, 15, and 16 show the last said handles, together with dishes or salvers in section, Fig. 13ª showing a part of Fig. 13 on an enlarged scale. Fig. 17 is a top view of that in Fig. 15. Figs. 18, 19, 20, 21 show still other modified forms of the handle, the last said figure also showing a dish or plate of a modified character adapted to receive it.

In my Patent No. 230,362, dated July 20, 1880, I have shown a detachable handle for dishes of glass or earthenware formed of a piece of metal bent into U shape, having the lower ends adapted to be sprung into place against the sides of the dish. In that case the elastic pressure was exerted inwardly, and therefore the ends of the handle would with most dishes as ordinarily constructed be so situated as to project outwardly more or less. Under some circumstances I have found it preferable to have the ends of the handle situated inside of those portions of the dish with which they engage. When so made the dish-handles do not project so as to allow of their being accidentally detached by blows or jars, and at the same time the parts with which they engage can be made tasty in appearance and ornamental, said parts serving as guards to prevent the accidental detaching of the handles.

In Figs. 1, 2, 3, and 9 I have shown a handle of my improved character, and in some of said figures a dish having it attached thereto. The handle proper consists of the U-shaped portion A, which is preferably made of a single piece of metal bent to the desired form, though it can be made by securing together properly two or more pieces of metal, if their lower ends be brought to the proper position relatively to each other to accomplish the effect set forth. In these figures B represents a dish or jar, one having been chosen, for illustration, of substantially the character used for holding pickles, &c. $b$ $b$ represent ears or lugs projecting outwardly from the jar, and in the case shown situated somewhat below the center horizontally. In each of these there is a vertical groove, $c'$, and a horizontal groove, $c$, Fig. 13ª. The handle in this case is formed with feet $a'$, situated across the legs $a$ $a$, and when the handle is detached and the legs occupy their normal position they are situated as illustrated in dotted lines in Fig. 1—that is to say, the parts $a'$ are farther apart than the lugs $b$. Therefore the legs of the handle can be caused to secure themselves upon the dish, for if they be first pressed together somewhat they can be slipped downwardly until the parts $a'$ seat themselves in the grooves $c$, and the elasticity of the legs $a$ will hold them firmly in place.

To assist in holding the handle firmly in an upright position, the jar may be formed with a bead or rib, A', having recesses at $a^2$, in which the legs $a$ can be seated.

It will be seen that when the handle is secured in this way the lower ends thereof do not project outwardly from the parts which hold it in place, and therefore it is not liable to receive shocks or blows of such character as to displace it.

The lugs $b$ $b$ may be made ornamental, and thus not only assist to hold the legs $a$, but also to guard them from displacement, and can be made to add to the tasty appearance of the dish.

In Figs. 4, 5, 6, and 8 are shown modified forms of handle and dish. In this case the foot $a'$ of the handle is wide and flat, and adapted to engage with a groove in the lug $b$, there being ears at A', instead of a continuous flange.

In Figs. 13 and 13ª a dish is shown having ears or lugs $b$ projecting above the rim, and with these outwardly-turned foot-pieces $a'$ on the handle and legs can engage in the same manner as that above described.

On the dishes provided with inwardly-turning flanges, as in Figs. 14, 15, 16, and 17, handles of the character shown in Figs. 10, 11, and 12 may be used, those in Figs. 10 and 11 having an upper plate, $a^2$, and a lower plate or ears, $a'$, adapted to engage with the flange.

In Figs. 12 and 16 the bail is secured to the foot-pieces $a$ by pivots, so that it can be allowed to fall down, although in this case the handle is held in place by an outwardly-acting elasticity, as in the constructions above described.

Figs. 18 and 20 illustrate the fact that the part A need not necessarily be formed on a curved line, although a curve of that character is generally preferred.

In Fig. 21 a salver or flat dish is shown, having pins or short lugs projecting inwardly, with which a bail or handle is adapted to engage, the latter having eyes $a^3$ at the bottom, which encircle the pins or lugs, and are forced outwardly by the elasticity of the bail.

I am aware of the fact that bails and handles of all various sorts have been secured to buckets, dishes, and other articles, and of course do not wish to be understood as broadly claiming such devices as my invention; but in the manufacture of glass dishes it has been found extremely difficult to attach handles thereto, on account of the ease with which they are fractured; and I am not aware of the fact that such a dish and handle have ever been combined in such way as that the displacement thereby is prevented by means which permit the dish to be made more ornamental.

What I claim is—

1. The combination, with a dish having resisting walls upon opposite sides, of a handle having downwardly-extending elastic legs, which are adapted, substantially as set forth, to be pressed outward against said resisting walls by their elasticity, to hold the handle in place upon the dish, substantially as set forth.

2. The combination, with a dish having two horizontally-arranged walls or surfaces opposite to each other, of a handle having outwardly-extending elastic legs, provided with outwardly-projecting parts which lie under the said walls or surfaces on the dish, and which by their elasticity are pressed outward to engage with said walls or surfaces, substantially as set forth.

3. The combination, with a dish having seats or recesses opposite to each other, of a handle having downwardly-extending elastic legs, and the foot-pieces hinged to said legs, and which by the elasticity of the legs are forced outward to engage with the dish in the said seats or recesses, substantially as set forth.

In testimony whereof I affix my signature in presence of two witnesses.

JOHN B. TIMBERLAKE.

Witnesses:
 CHARLES LOWE,
 WILBUR B. TIMBERLAKE.